United States Patent
Kim et al.

(10) Patent No.: US 9,837,661 B2
(45) Date of Patent: Dec. 5, 2017

(54) CATHODE ACTIVE MATERIAL FOR LITHIUM SECONDARY BATTERY AND LITHIUM SECONDARY BATTERY COMPRISING THE SAME

(71) Applicant: ECOPRO BM CO., LTD., Cheongju-si, Chungcheongbuk-do (KR)

(72) Inventors: Jik Soo Kim, Chungcheongbuk-do (KR); Moon Ho Choi, Chungcheongbuk-do (KR); Jin Kyeong Yun, Chungcheongbuk-do (KR); Jae Yong Jung, Chungcheongbuk-do (KR); Suk Yong Jeon, Chungcheongbuk-do (KR); Jong Seung Shin, Chungcheongbuk-do (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 42 days.

(21) Appl. No.: 14/782,944

(22) PCT Filed: Jan. 21, 2015

(86) PCT No.: PCT/KR2015/000647
§ 371 (c)(1),
(2) Date: Oct. 7, 2015

(87) PCT Pub. No.: WO2016/039511
PCT Pub. Date: Mar. 17, 2016

(65) Prior Publication Data
US 2016/0268594 A1    Sep. 15, 2016

(30) Foreign Application Priority Data

Sep. 11, 2014  (KR) .................. 10-2014-0119852

(51) Int. Cl.
*H01M 4/36* (2006.01)
*H01M 4/58* (2010.01)
(Continued)

(52) U.S. Cl.
CPC ............. *H01M 4/366* (2013.01); *C01B 25/16* (2013.01); *C01B 25/45* (2013.01); *C01G 45/006* (2013.01);
(Continued)

(58) Field of Classification Search
CPC combination set(s) only.
See application file for complete search history.

(56) References Cited

U.S. PATENT DOCUMENTS

2009/0297947 A1* 12/2009 Deng .................. H01M 4/0471
429/218.1
2010/0019194 A1*  1/2010 Fujiwara ............... H01M 4/131
252/182.1

(Continued)

FOREIGN PATENT DOCUMENTS

KR   10-2007-0116158 A   12/2007
KR   10-2013-0138073 A   12/2013

*Primary Examiner* — Kaity Chandler
(74) *Attorney, Agent, or Firm* — Saliwanchik, Lloyd & Eisenschenk (57) ABSTRACT

The present invention relates to an anode active material for lithium secondary battery and a lithium secondary battery including the same, and more specifically it relates to an anode active material for lithium secondary battery in which the a lithium ion diffusion path in the primary particles is formed to exhibit specific directivity, and a lithium secondary battery including the same.

The cathode active material for lithium secondary battery of the present invention has a lithium ion diffusion path exhibiting specific directivity in the primary particles and the secondary particles, thus not only the conduction velocity of the lithium ion is fast and the lithium ion conductivity is high (Continued)

but also the cycle characteristics are improved as the crystal structure hardly collapses despite repeated charging and discharging.

10 Claims, 6 Drawing Sheets

(51) Int. Cl.
- *H01M 4/505* (2010.01)
- *H01M 10/0525* (2010.01)
- *H01M 4/525* (2010.01)
- *H01M 10/052* (2010.01)
- *C01B 25/16* (2006.01)
- *C01G 45/00* (2006.01)
- *C01G 45/12* (2006.01)
- *C01G 51/00* (2006.01)
- *C01G 53/00* (2006.01)
- *C01B 25/45* (2006.01)
- *H01M 4/02* (2006.01)

(52) U.S. Cl.
CPC ....... *C01G 45/1228* (2013.01); *C01G 51/006* (2013.01); *C01G 51/42* (2013.01); *C01G 51/50* (2013.01); *C01G 53/006* (2013.01); *C01G 53/42* (2013.01); *C01G 53/50* (2013.01); *H01M 4/505* (2013.01); *H01M 4/525* (2013.01); *H01M 4/5825* (2013.01); *H01M 10/052* (2013.01); *H01M 10/0525* (2013.01); *C01P 2002/20* (2013.01); *C01P 2004/03* (2013.01); *C01P 2004/04* (2013.01); *C01P 2004/45* (2013.01); *C01P 2004/51* (2013.01); *C01P 2004/54* (2013.01); *C01P 2006/12* (2013.01); *C01P 2006/40* (2013.01); *H01M 2004/028* (2013.01)

(56) References Cited

U.S. PATENT DOCUMENTS

| | | | |
|---|---|---|---|
| 2010/0233540 A1* | 9/2010 | Choy | C01B 25/45 429/220 |
| 2011/0003206 A1* | 1/2011 | Yura | H01M 4/505 429/224 |
| 2011/0206988 A1* | 8/2011 | Tanaka | H01M 4/505 429/220 |
| 2011/0287315 A1* | 11/2011 | Choy | C01B 25/45 429/211 |
| 2012/0219855 A1* | 8/2012 | Ozaki | H01M 4/02 429/211 |
| 2012/0256337 A1* | 10/2012 | Yokoyama | H01M 4/525 264/15 |
| 2013/0022874 A1* | 1/2013 | Park | B82Y 30/00 429/223 |
| 2014/0087265 A1* | 3/2014 | Yura | H01M 4/131 429/231.1 |
| 2014/0110641 A1* | 4/2014 | Murotani | H01M 4/485 252/519.15 |
| 2014/0322604 A1* | 10/2014 | Kitagawa | H01M 4/5825 429/221 |
| 2015/0086787 A1* | 3/2015 | Yura | H01M 4/131 428/403 |
| 2015/0270544 A1* | 9/2015 | Yoshida | H01M 4/485 429/209 |
| 2015/0270545 A1* | 9/2015 | Axelbaum | H01M 4/525 429/223 |

* cited by examiner

CATHODE ACTIVE MATERIAL FOR LITHIUM SECONDARY BATTERY AND LITHIUM SECONDARY BATTERY COMPRISING THE SAME

CROSS-REFERENCE TO RELATED APPLICATIONS

This application is the U.S. national stage application of International Patent Application No. PCT/KR2015/000647, filed Jan. 21, 2015, which claims priority to Korean Application No. 10-2014-0119852, filed Sep. 11, 2014, the disclosures of each of which are incorporated herein by reference in their entirety.

TECHNICAL FIELD

The present invention relates to a cathode active material for lithium secondary battery and a lithium secondary battery including the same, and more specifically it relates to a cathode active material for lithium secondary battery in which the lithium ion diffusion paths in the primary particles and the secondary particles are formed to exhibit specific directivity, and a lithium secondary battery including the same.

BACKGROUND ART

Recently, interest in the energy storage technology has been increased. The effort to research and develop an electrochemical device has been gradually materialized as the application field of the energy storage technology has been expanded to a mobile phone, a camcorder, a notebook PC, and an electric vehicle. The electrochemical device is a field which attracts the most attention in this respect, and in particular, the development of a secondary battery capable of being charged and discharged is the focus of attention.

Among the secondary batteries which are currently applied, the lithium ion battery developed in the early 1990s has been widely used as a power source of portable apparatuses since it was developed in 1991 as a small battery, a light-weight battery, and a large capacity battery. The lithium secondary battery is in the spotlight due to its advantages that the operating voltage is higher and the energy density is far greater as compared to batteries of prior art, such as a Ni-MH battery, a Ni—Cd battery, and a sulfuric acid-Pb battery which use an aqueous electrolytic solution. In particular, the lithium secondary battery is mainly adopted as a medium- or large-sized battery with an energy unit of kWh or more used for electric vehicles and energy storage, and a cathode active material which has a high capacity and is usable for a long period of time is desired for this purpose.

The full-scale commercialization of large capacity secondary batteries containing manganese spinel (LMO) and olivine-based cathode materials (LFP) which exhibit excellent thermal stability is inhibited due to a low energy density thereof, and thus the application of a layered type cathode material having a high capacity is increasingly required for an improvement in battery properties. A layered type cathode material among the cathode materials for lithium secondary battery can realize the highest capacity among the materials which are currently commercialized. The use of $LiCoO_2$ that is frequently used in a small IT apparatus such as a smart phone in a medium- or large-sized battery is inhibited by the problems of safety, a low capacity, the economic efficiency due to a high cost and limited resource due to the reserves of cobalt metal of a main raw material as compared to other transition metals, the environmental regulations due to the environmental pollution, and the like. A number of researches on $LiNiO_2$ which has the same structure as $LiCoO_2$ have been carried out for the advantages that its price is relatively inexpensive and can have a high theoretical capacity of 200 mAh/g. However, $LiNiO_2$ has not been commercialized due to the problems such as poor stability and drastic deterioration in lifespan by structural instability generated when being produced.

In order to improve the disadvantages of $LiNiO_2$, a part of nickel is substituted with a transition metal element so as to slightly shift the temperature at which the heat generation starts to a higher temperature or to prevent drastic heat generation, and other measures are attempted. The material, $LiNi_{1-x}Co_xO_2$ (x=0.1 to 0.3), obtained by substituting a part of nickel with cobalt exhibits relatively excellent charge and discharge characteristics and lifespan characteristics as compared to $LiNiO_2$ but still does not exhibit sufficient lifespan performance. In addition, a number of technologies related to the composition and production of a Li—Ni—Mn-based composite oxide obtained by substituting a part of Ni with Mn which exhibits excellent thermal stability or a Li—Ni—Mn—Co-based composite oxide obtained by substituting a part of Ni with Mn and Co are known, and a new-concept cathode active material has been recently disclosed in Japanese Patent Application Laid-Open No. 2000-227858 in which not $LiNiO_2$ or $LiMnO_2$ is partially substituted with a transition metal but Mn and Ni compounds are uniformly dispersed in the atomic level to form a solid solution.

According to European Patent 0,918,041 or U.S. Pat. No. 6,040,090 on the composition of a Li—Ni—Mn—Co-based composite oxide obtained by substituting Ni with Mn and Co, $LiNi_{1-x}Co_xMn_yO_2$ (0<y≤0.3) exhibits improved lifespan performance and thermal stability as compared to an existing material composed of only Ni and Co but still has problems to be solved, such as poor thermal stability and deterioration in lifespan performance as a Ni-based material.

In order to solve this disadvantage, a patent on a lithium transition metal oxide having a concentration gradient in the metal composition is proposed in Korea Patent Application No. 10-2005-7007548. However, by this method, a high capacity can be realized as the cathode active material is synthesized so as to have different metal compositions in the inner layer and the outer layer, but the metal composition is not continuously and gradually changed in the cathode active material thus produced. A gradual gradient of metal composition may be achieved through the heat treatment process, but the interface between the inner layer and the outer layer may act as a resistant component to lower the output and to deteriorate the lifespan performance when the cathode active material is used for a long period of time, and a difference in concentration gradient is not substantially generated at a high temperature for heat treatment of 850° C. or higher due to the thermal diffusion of metal ions and thus the effect of performance improvement is insignificant. In addition, the powder synthesized by this invention has a low tap density since ammonia of a chelating agent is not used therein, and thus this powder is unsuitable to be used as a cathode active material for lithium secondary battery required to have a high energy density.

DISCLOSURE OF THE INVENTION

Technical Problem

The present invention is made in order to solve the above problem, and an object thereof is to provide a cathode active material for lithium secondary battery having a new structure in which the lithium ion diffusion path in the primary particles and the secondary particles exhibit specific directivity so as to realize a long lifespan.

Another object of the present invention is to provide a lithium secondary battery including the cathode active material for lithium secondary battery of the present invention.

Technical Solution

In order to achieve the above object, the present invention provides a cathode active material for lithium secondary battery, which has a layered structure of a rhombohedral crystal structure of an R3m structure as illustrated in FIG. 1 to FIG. 6, is a cathode active material having a layered structure containing a transition metal, and is secondary particles formed by aggregation of primary particles, and in which an aspect ratio of the primary particles is 1 or more and an a-axis direction that is a lithium ion diffusion path in the primary particles is formed to be parallel to a longer side of the primary particles.

In the cathode active material for lithium secondary battery according to the present invention, an a-axis direction that is the lithium ion diffusion path in the primary particles exhibits directivity in a center direction of the secondary particles.

In the cathode active material for lithium secondary battery according to the present invention, a lithium ion diffusion path in the primary particles is formed to exhibit directivity in a center direction of the entire particles and thus a lithium ion diffusion path from a surface to a center of the secondary particles has a one-dimensional or two-dimensional tunnel structure.

In the cathode active material for lithium secondary battery according to the present invention, a lithium ion diffusion path in the primary particles forms an angle of ±40° with a connecting line connecting a surface of the secondary particles with a center of the secondary particles.

In addition, in the cathode active material for lithium secondary battery according to the present invention, an area occupied by primary particles having the lithium ion diffusion path which forms an angle of ±40° with a connecting line connecting a surface of the secondary particles with a center of the secondary particles is 10% or more of an area of the secondary particles. In other words, in the cathode active material for lithium secondary battery according to the present invention, the lithium ion diffusion path is formed to exhibit directivity toward the center of the secondary particles even in the primary particles.

In the cathode active material for lithium secondary battery according to the present invention, a lithium ion diffusion path in the primary particles is formed to exhibit directivity in a center direction of the entire particles and thus a lithium ion diffusion path from a surface to a center of the secondary particles has a one-dimensional or two-dimensional tunnel structure.

In the cathode active material for lithium secondary battery according to the present invention, by such a lithium ion diffusion path, not only the conduction velocity of the lithium ion is fast and the lithium ion conductivity is high but also the cycle characteristics are improved as the crystal structure hardly collapses despite repeated charging and discharging. In other words, in the cathode active material for lithium secondary battery according to the present invention, the charge transfer resistance, diffusion, migration, and convection between the active material particles and the lithium ions or between the electrolytes are decreased by the lithium ion diffusion path formed in a one-dimensional tunnel structure of a linear path, and thus the internal impedance of the battery can be significantly decreased.

In the cathode active material for lithium secondary battery according to the present invention, an aspect ratio of the primary particles is 1 or more and a lithium ion diffusion path in the primary particles is formed to be parallel to a major axis, namely a lateral axis. In other words, as described above, the crystal structure part that is affected by the storing and releasing procedure of lithium in the primary particles decreases as the lithium ion path is formed in the longitudinal direction even though the lithium ion is stored into and released from the primary particles in the charging and discharging procedure and the charge and discharge are repeated, and as a result, the structural stability according to the charge and discharge is secured and the lifespan characteristics are improved.

In the cathode active material for lithium secondary battery according to the present invention, an area occupied by primary particles having the aspect ratio of 1 or more and the a-axis direction that is a lithium ion diffusion path in the particles formed to be parallel to a major axis of the particles is 40% or more of an area of the secondary particles.

In the cathode active material for lithium secondary battery according to the present invention, the secondary particles are represented by the following Formula 1 and a concentration of transition metal is constant in the entire particles.

<Formula 1>

(In Formula 1, 0.9≤x≤1.15, 0≤a≤0.5, 0≤b≤0.65, 0≤c≤0.15, 0≤y≤0.1, Me is at least one or more elements selected from the group consisting of Al, Mg, B, P, Ti, Si, Zr, Ba and any combination thereof, and X is at least one or more elements or molecules selected from anions of F, BO$_3$, and PO$_4$.)

The present invention also provides a lithium secondary battery including the cathode active material for lithium secondary battery according to the present invention.

Advantageous Effects

In the cathode active material for lithium secondary battery according to the present invention, the a-axis direction that is the lithium ion diffusion path in the primary particles is formed to be parallel to the longer side of the primary particles and to exhibit directivity in the center direction of the secondary particles, thus the storage of the lithium ion into and release thereof from the primary particles are facilitated in the charging and discharging procedure, and the capacity characteristics and lifespan characteristics of the battery including the cathode active material for lithium secondary battery according to the present invention are significantly improved as a result.

MODE FOR CARRYING OUT THE INVENTION

Hereinafter, the present invention will be described in more detail with reference to Examples. However, the present invention is not limited by the following Examples.

Example 1

Into a co-precipitation reactor (volume of 100 L, output of rotary motor: 80 W or more), 20 L of distilled water and 1000 g of ammonia as a chelating agent were introduced and stirred at 350 rpm using the motor while maintaining the internal temperature of the reactor at 48° C. Nitrogen gas was continuously supplied to the reactor at a flow rate of 3 L/min.

A 2.5 M aqueous precursor solution prepared by mixing nickel sulfate, cobalt sulfate, and manganese sulfate at a molar ratio of 1:1:1 and a 28% aqueous ammonia solution were continuously introduced into the reactor at a rate of 3.25 L/hr and 0.15 L/hr, respectively. In addition, in order to adjust the pH, a 25% aqueous solution of sodium hydroxide was continuously supplied to the liquid surface in the reactor at a rate of 0.835 L/hr so as to have a pH of 11.5. The temperature of the reaction solution was maintained at from 48 to 50° C. and the 25% aqueous solution of sodium hydroxide was added to the reaction solution so as to maintain the pH at 11.5, thereby forming metal hydroxide particles. The precipitate of spherical nickel-manganese-cobalt composite hydroxide was collected from the reactor after the reaction was terminated.

The composite metal hydroxide precipitated was filtered, washed with water, dried in a hot air dryer at 100° C. for 12 hours, thereby obtaining a precursor powder in the form of a composite metal hydroxide having a composition of $(Ni_{0.33}Co_{0.33}Mn_{0.33})(OH)_2$.

The composite metal hydroxide and lithium carbonate ($Li_2CO_3$) were mixed together at a molar ratio of 1:1.00 to 1.10, then heated at a temperature rising rate of 2° C./min, and then fired at from 750 to 1000° C. for from 10 to 20 hours, thereby obtaining the powder of an cathode active material of $Li(Ni_{0.33}Co_{0.33}Mn_{0.33})O_2$.

Example 2

The powder of a cathode active material was produced by the same method as in Example 1 except that the molar ratio of nickel sulfate, cobalt sulfate, and manganese sulfate introduced was adjusted so that the cathode active material had a composition of $Li(Ni_{0.5}Co_{0.2}Mn_{0.3})O_2$.

Example 3

The powder of a cathode active material was produced by the same method as in Example 1 except that the molar ratio of nickel sulfate, cobalt sulfate, and manganese sulfate introduced was adjusted so that the cathode active material had a composition of $Li(Ni_{0.7}Co_{0.2}Mn_{0.1})O_2$.

Example 4

The powder of a cathode active material was produced by the same method as in Example 1 except that the molar ratio of nickel sulfate, cobalt sulfate, and manganese sulfate introduced was adjusted so that the cathode active material had a composition of $Li(Ni_{0.8}Co_{0.1}Mn_{0.1})O_2$.

Example 5

The powder of a cathode active material was produced by the same method as in Example 4 except that the molar ratio of nickel sulfate, cobalt sulfate, and manganese sulfate introduced was adjusted so that the cathode active material had a composition of $Li(Ni_{0.820}Co_{0.145}Mn_{0.035})O_2$.

Example 6

The powder of an cathode active material was produced by the same method as in Example 4 except that the molar ratio of nickel sulfate, cobalt sulfate, and manganese sulfate introduced was adjusted so that the cathode active material had a composition of $Li(Ni_{0.90}Co_{0.07}Mn_{0.03})O_2$.

Comparative Example 1

Into a co-precipitation reactor having a volume of 100 L, 80 L of distilled water and 1000 g of ammonia as a chelating agent were introduced and stirred at 5000 rpm using the motor while maintaining the internal temperature of the reactor at 50±2° C. In addition, nitrogen gas was continuously supplied to the reactor at a flow rate of 3 L/min. Next, a 1 M aqueous precursor solution prepared by mixing nickel sulfate, cobalt sulfate, and manganese sulfate at a molar ratio of 8:1:1 and a 28% aqueous ammonia solution were continuously introduced into the reactor at a rate of 6.5 L/hr and 0.6 L/hr, respectively. In addition, in order to adjust the pH, a 25% aqueous solution of sodium hydroxide was continuously supplied to the liquid surface in the reactor at a rate of from 1.5 to 2.0 L/hr so as to have a pH of from 11 to 12. The temperature of the reaction solution was maintained at 50±2° C. and the 25% aqueous solution of sodium hydroxide was added to the reaction solution so as to maintain the pH at from 11 to 12, thereby forming metal hydroxide particles.

In 30 hours after the inside of the reactor reached a steady-state, the hydroxide particles discharged from the overflow pipe were continuously collected, washed with water, dried in a hot air dryer at 100° C. for 12 hours, thereby obtaining a precursor powder in the form of a composite metal hydroxide having a composition of $(Ni_{0.8}Co_{0.1}Mn_{0.1})(OH)_2$.

The composite metal hydroxide and lithium hydroxide ($LiOH.H_2O$) were mixed together at a molar ratio of 1:1.00 to 1.10, then heated at a temperature rising rate of 2° C./min, then subjected to the heat treatment at 550° C. for 10 hours, and then fired at 750° C. for 20 hours, thereby obtaining the powder of an cathode active material.

Comparative Example 2

The powder of an cathode active material was synthesized by the same method as in Comparative Example 1 except that a 1 M aqueous precursor solution prepared by mixing nickel sulfate, cobalt sulfate, and aluminum nitrate at a molar ratio of 81.5:15:3.5 was used.

<Experimental Example> Taking of SEM Image

Figure 1:
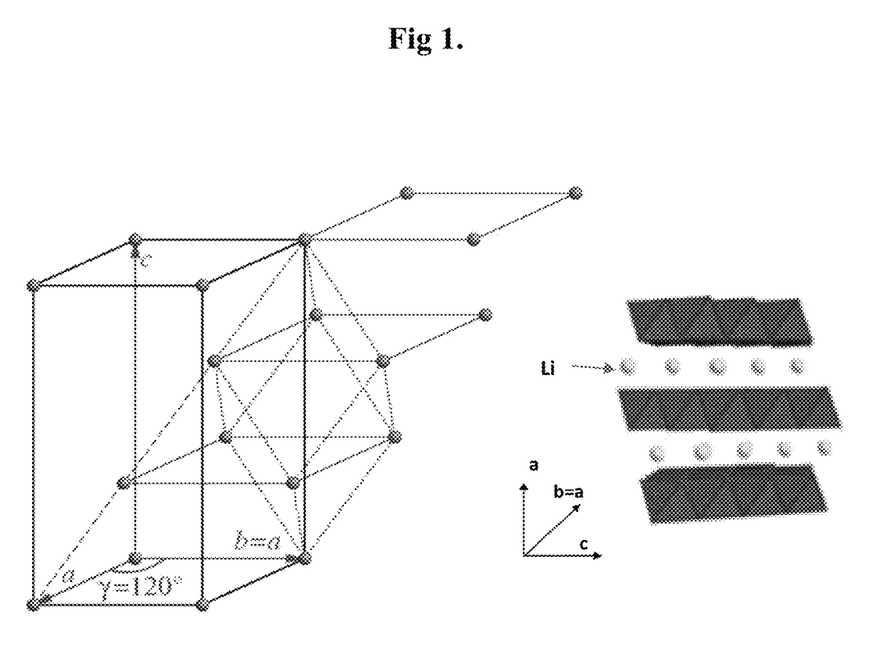
FIG. 1 illustrates a rhombohedral crystal structure.
Figure 2:
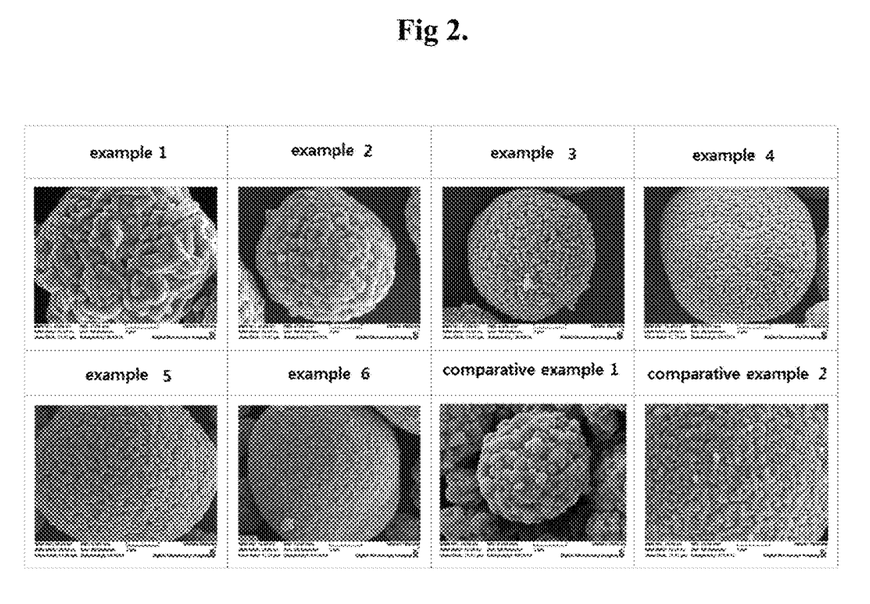
FIG. 2 illustrates SEM images of the cathode active material particles produced in Examples 1 to 6 and Comparative Examples 1 and 2 of the present invention.
Figure 3:
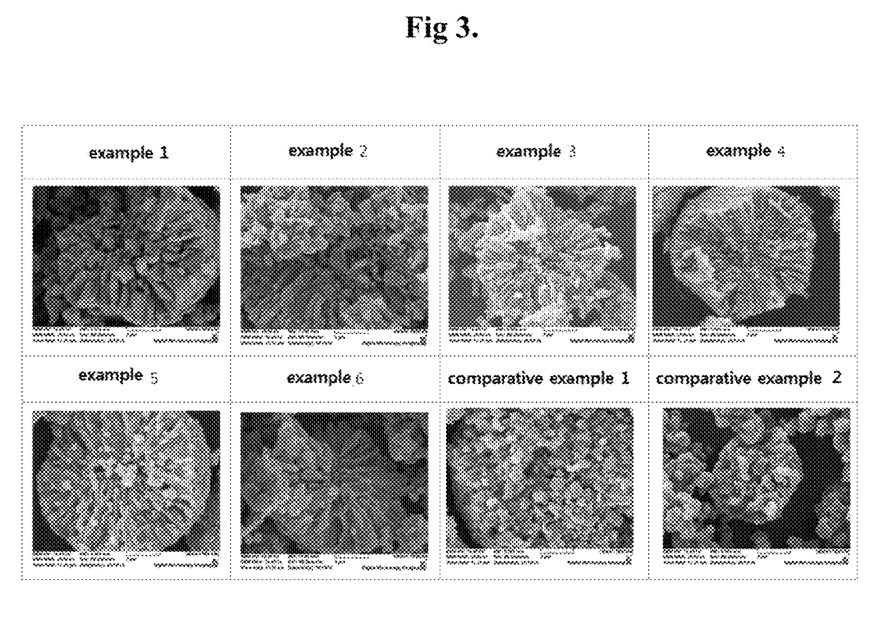
FIG. 3 illustrates the results of the fracture surfaces of the cathode active material particles produced in Examples 1 to 6 and Comparative Examples 1 and 2 of the present invention taken as SEM images.

SEM images of the particles and fracture surfaces of the cathode active materials produced in Examples 1 to 6 and Comparative Examples 1 and 2 were taken and the results are illustrated in FIG. 2 and FIG. 3.

From FIG. 2, it can be seen that the cathode active material particles produced in Examples 1 to 6 and Comparative Examples 1 and 2 are spherical secondary particles formed by aggregation of the primary particles.

From FIG. 3 of SEM images of the fracture surfaces of the particles, it can be seen that, in the case of the particles produced in Examples 1 to 6 of the present invention, the aspect ratio of the primary particles is 1 or more, the primary particles grow in the longitudinal direction to exhibit directivity in the center direction of the particles, but in the case of Comparative Examples 1 and 2, the primary particles are close to a circle and the directivity of the primary particles is not observed in the inside of the secondary particles.

<Experimental Example> Taking of TEM Image

Figure 4:
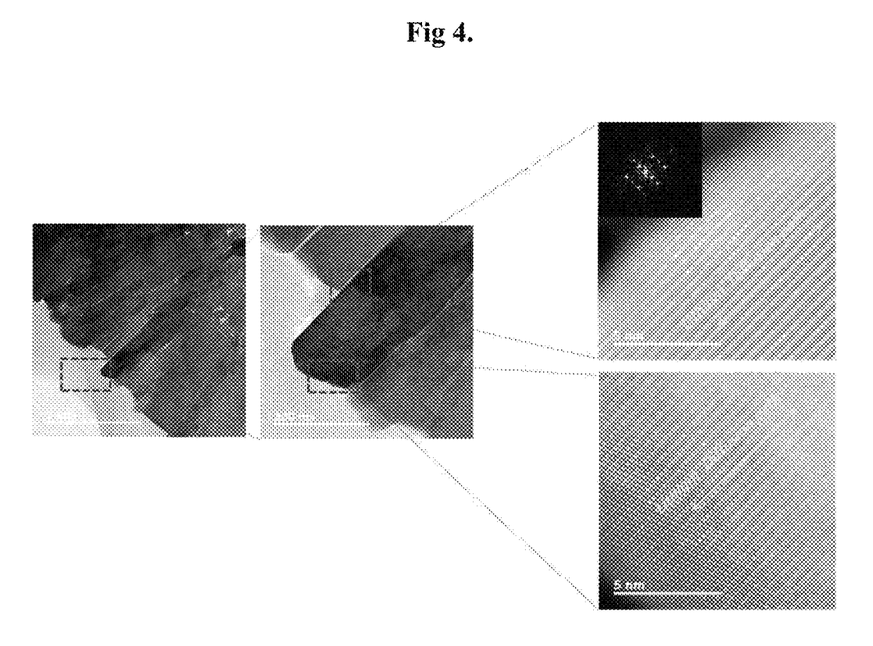
FIG. 4 illustrates the results of the shape and structure of the primary particles in the particles of Example 4 of the present invention determined by TEM.
Figure 5:
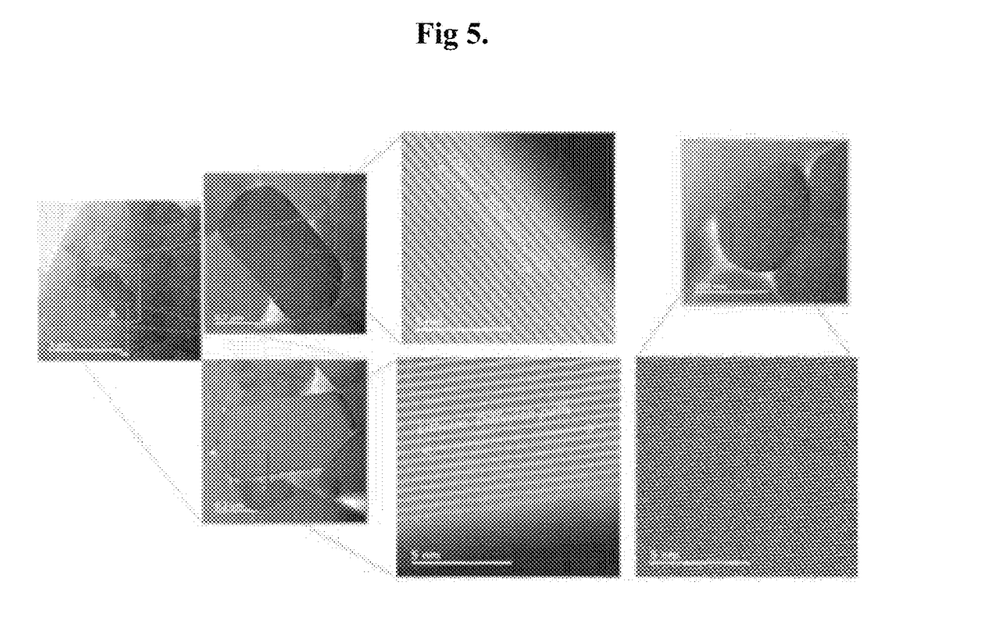
FIG. 5 illustrates the measurement results of the shape and structure of the primary particles in the particles of Comparative Example 1 of the present invention determined by TEM.
Figure 6:
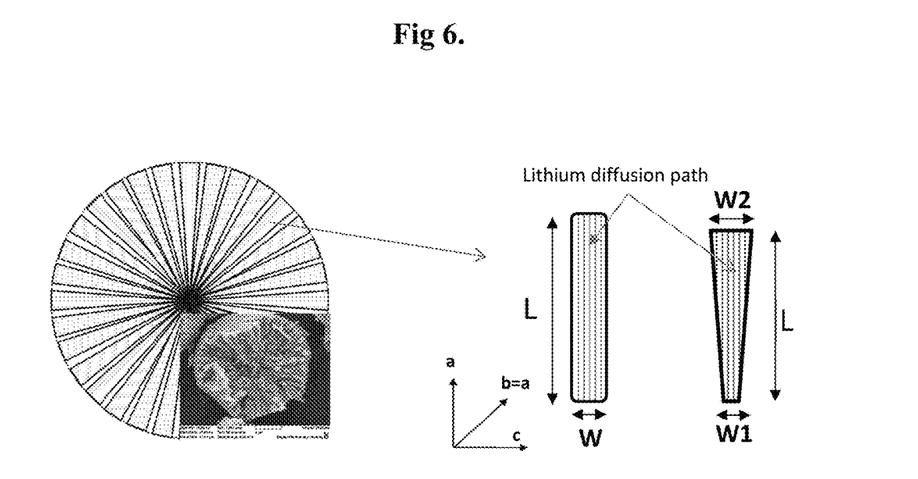
FIG. 6 illustrates a schematic diagram of the particle cross-section, primary particles, and lithium ion diffusion path of the cathode active material according to the present invention.

The shape and structure of the primary particles of Example 4 and Comparative Example 1 were determined by TEM, and the results are illustrated in FIG. 4 and FIG. 5, respectively.

From FIG. 4, it can be confirmed that, in the case of the particles produced in Example 4 of the present invention, the a-axis direction that is the lithium ion diffusion path in the primary particles is formed in the longitudinal direction, and at the same time, the a-axis direction that is the lithium ion diffusion path in the primary particles exhibits directivity in the center direction of the secondary particles.

On the other hand, in the case of FIG. 5 illustrating TEM images of the particles produced in Comparative Example 1, it can be confirmed that the a-axis direction that is the lithium ion diffusion path is not only directed toward the center direction of the particles but also is not formed to be parallel to the major axis.

<Experimental Example> Measurement of Properties of Particles

TABLE 1

| Division | Result of ICP (mole %) | | | | Result of particle size (μm) | | |
| --- | --- | --- | --- | --- | --- | --- | --- |
| | Ni | Co | Mn | Al | D10 | D50 | D90 |
| Example 1 | 33.6 | 33.7 | 32.7 | — | 7.8 | 10.4 | 14.1 |
| Example 2 | 49.6 | 20.3 | 30.1 | — | 7.8 | 10.6 | 14.6 |
| Example 3 | 70.2 | 20.3 | 9.6 | — | 7.5 | 9.9 | 12.8 |
| Example 4 | 79.1 | 11.3 | 9.7 | — | 7.2 | 9.5 | 11.9 |
| Example 5 | 82.1 | 14.4 | — | 3.5 | 4.1 | 10.7 | 14.4 |
| Example 6 | 89.5 | 7.5 | — | 3.1 | 4.5 | 11.4 | 15.3 |
| Comparative Example 1 | 80.2 | 9.9 | 9.7 | — | 4.7 | 9.3 | 14.0 |
| Comparative Example 2 | 81.5 | 14.8 | — | 3.4 | 7.2 | 11.4 | 15.3 |

<Production Example> Production of Battery

The cathode active materials produced in Examples 1 to 6 and Comparative Examples 1 and 2, super-P as a conductive agent, and polyvinylidene fluoride (PVdF) as a binder were mixed together at a weight ratio of 92:5:3 to prepare a slurry. The slurry was uniformly coated on an aluminum foil having a thickness of 15 μm and vacuum-dried at 135° C. to produce a cathode for lithium secondary battery.

A coin battery was produced according to a usually known manufacturing process using the above cathode, a lithium foil as a counter electrode, a porous polyethylene film (Celgard 2300 manufactured by Celgard, LLC., thickness: 25 μm) as a separator, and a liquid electrolytic solution in which $LiPF_6$ was dissolved at a concentration of 1.15 M in a solvent prepared by mixing ethylene carbonate and ethyl methyl carbonate at a volume ratio of 3:7.

<Experimental Example> Measurement of Properties of Battery

The initial capacity, initial efficiency, rate characteristics, and lifespan characteristics of the batteries produced using the active materials produced in Examples 1 to 6 and Comparative Examples were measured, and the results are presented in the following Table 2.

From Table 2 below, it can be confirmed that the properties of the batteries including the active materials produced in Examples of the present invention are more significantly improved than those of the batteries including the active materials produced in Comparative Examples.

TABLE 2

| Division | Li/M ratio | BET m2/g | Initial capacity (mAh/g) | | Initial efficiency (%) | Rate characteristics % (2 C/0.1 C) | Lifespan performance % at 100th cycle |
| --- | --- | --- | --- | --- | --- | --- | --- |
| | | | Charge quantity | Discharge quantity | | | |
| Example 1 | 1.07 | 0.23 | 180 | 161 | 89.4 | 88.3 | 96.8 |
| Example 2 | 1.02 | 0.25 | 192 | 171 | 89.1 | 87.6 | 89.7 |
| Example 3 | 1.01 | 0.28 | 210 | 199 | 94.5 | 87.1 | 89.5 |
| Example 4 | 1.01 | 0.27 | 224 | 203 | 90.6 | 87.9 | 90.9 |
| Example 5 | 1.00 | 0.32 | 220 | 201 | 91.3 | 87.2 | 88.2 |
| Example 6 | 0.99 | 0.48 | 237 | 210 | 88.7 | 86.2 | 82.8 |
| Comparative Example 1 | 1.02 | 0.47 | 227 | 204 | 89.8 | 82.5 | 81.4 |
| Comparative Example 2 | 1.01 | 0.26 | 219 | 201 | 91.6 | 83.4 | 80.3 |

INDUSTRIAL APPLICABILITY

As described above, it can be said that the cathode active material for lithium secondary battery according to the present invention is significantly useful in that the a-axis direction that is the lithium ion diffusion path in the primary particles is formed to be parallel to the longer side of the primary particles and to exhibit directivity in the center direction of the secondary particles, thus the storage of the lithium ion into and release thereof from the primary particles are facilitated in the charging and discharging procedure, and the capacity characteristics and lifespan characteristics of the battery including the cathodeactive material for lithium secondary battery according to the present invention are significantly improved.

The invention claimed is:

1. A cathode active material for lithium secondary battery, which is a cathode active material having a layered structure containing a transition metal, and comprises secondary particles formed by aggregation of primary particles, wherein
    an aspect ratio of the primary particles is 1 or more, and
    an a-axis direction that is a lithium ion diffusion path in the primary particles is formed to be parallel to a longer side of the primary particles,
    wherein the a-axis direction exhibits directivity in a center direction of the secondary particles, and
    wherein the lithium ion diffusion path in the primary particles is formed in a direction towards a center of the entirety of the particles, such that a lithium ion diffusion path from a surface to a center of the secondary particles has a one-dimensional or two-dimensional tunnel structure.

2. The cathode active material for lithium secondary battery according to claim 1, wherein the a-axis direction forms an angle of ±40° with a connecting line connecting a surface of the secondary particles with a center of the secondary particles.

3. The cathode active material for lithium secondary battery according to claim 1, wherein an area occupied by the primary particles having the lithium ion diffusion path, which forms an angle of ±40° with a connecting line connecting a surface of the secondary particles with a center of the secondary particles, is 10% or more of an area of the secondary particles.

4. The cathode active material for lithium secondary battery according to claim 1, wherein an area occupied by the primary particles having the aspect ratio of 1 or more and the lithium ion diffusion path in the particles formed to be parallel to a major axis of the particles among the primary particles is 40% or more of an area of the secondary particles.

5. The cathode active material for lithium secondary battery according to claim 1, wherein the secondary particles are represented by the following Formula 1 and a concentration of transition metal is constant in the entire particles:

$$Li_xNi_{1-a-b-c}Co_aMn_bMe_cO_{2-y}X_y \quad \text{<Formula 1>}$$

(in Formula 1, 0.9≤x≤1.15, 0≤a≤0.5, 0≤b≤0.65, 0≤c≤0.15, 0≤y≤0.1, Me is at least one or more elements selected from the group consisting of Al, Mg, B, P, Ti, Si, Zr, Ba, and any combination thereof; and X is at least one or more elements or molecules selected from anions of F, BO₃, and PO₄).

6. A lithium secondary battery comprising the cathode active material for lithium secondary battery according to claim 1.

7. A lithium secondary battery comprising the cathode active material for lithium secondary battery according to claim 2.

8. A lithium secondary battery comprising the cathode active material for lithium secondary battery according to claim 3.

9. A lithium secondary battery comprising the cathode active material for lithium secondary battery according to claim 4.

10. A lithium secondary battery comprising the cathode active material for lithium secondary battery according to claim 5.

* * * * *